W. WITHINGTON.
METHOD OF MAKING STRAP FERRULES.
APPLICATION FILED AUG. 4, 1917.
1,292,202.
Patented Jan. 21, 1919.
2 SHEETS—SHEET 1.
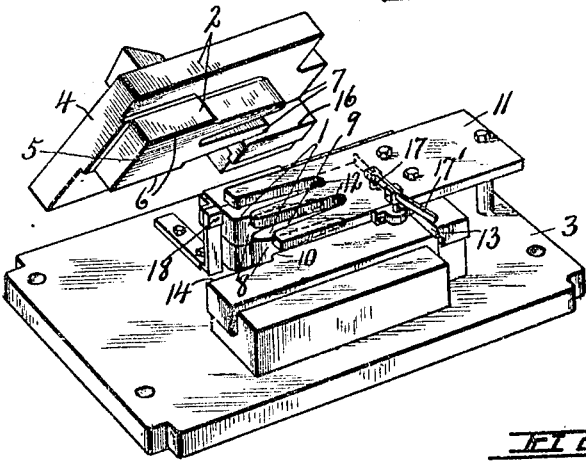
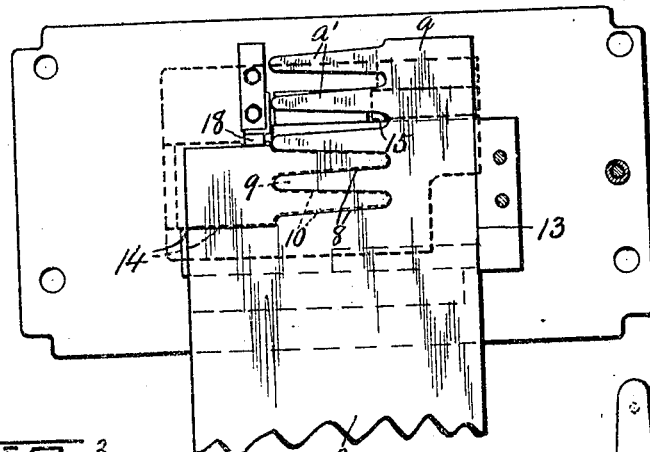
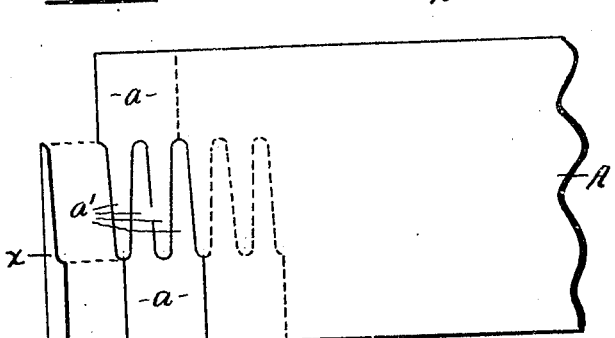
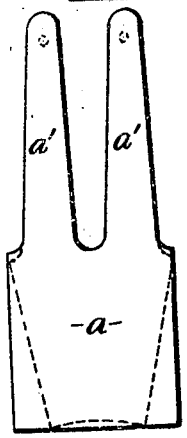
WITNESSES:
INVENTOR
W. Withington
BY Howard P. Denison
ATTORNEY.

W. WITHINGTON.
METHOD OF MAKING STRAP FERRULES.
APPLICATION FILED AUG. 4, 1917.
1,292,202.
Patented Jan. 21, 1919.
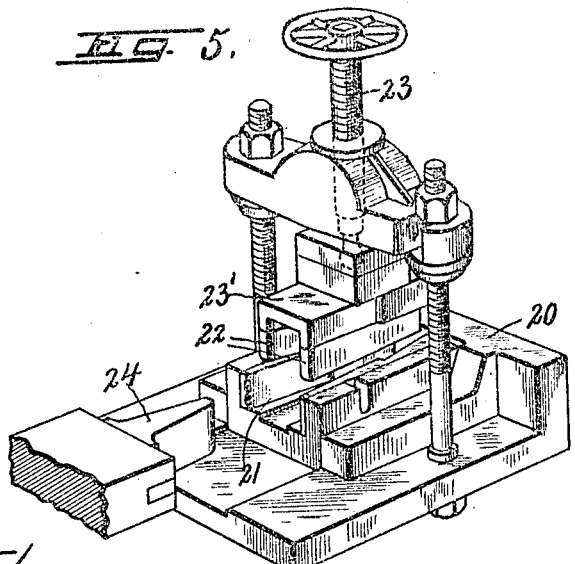
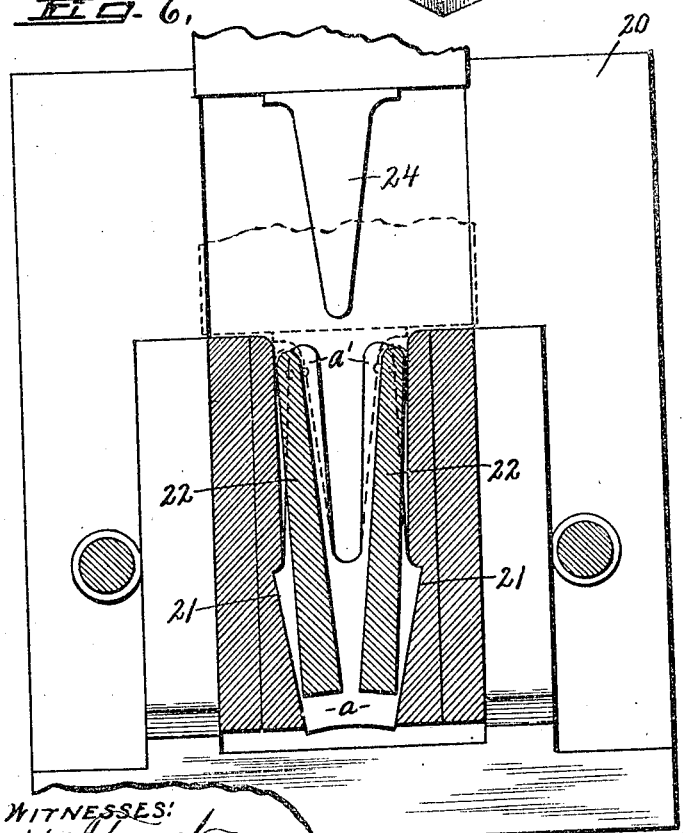
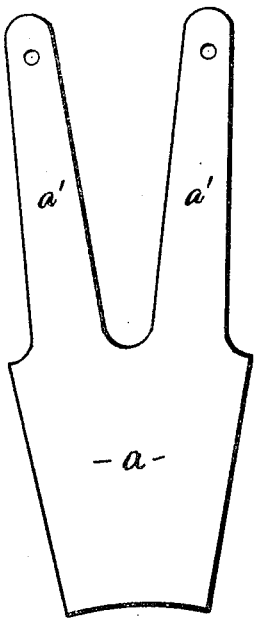
INVENTOR
W. Withington
BY Howard P. Denison
ATTORNEY.

UNITED STATES PATENT OFFICE.

WINTHROP WITHINGTON, OF JACKSON, MICHIGAN, ASSIGNOR TO THE AMERICAN FORK & HOE COMPANY, OF CLEVELAND, OHIO, A CORPORATION OF OHIO.

METHOD OF MAKING STRAP-FERRULES.

1,292,202. Specification of Letters Patent. Patented Jan. 21, 1919.

Application filed August 4, 1917. Serial No. 184,487.

*To all whom it may concern:*

Be it known that I, WINTHROP WITHINGTON, a citizen of the United States of America, and resident of Jackson, in the county of Jackson, in the State of Michigan, have invented new and useful Improvements in Methods of Making Strap-Ferrules, of which the following, taken in connection with the accompanying drawings, is a full, clear, and exact description.

This invention relates to an improved method of making strap ferrules which are usually cut or stamped to the desired furcated blank from flat sheet metal to form the main tapered body or ferrule proper and spaced arms or straps projecting from one end thereof so that the main body may be rolled upon a conical form or tool end of the handle and its longitudinal edges brazed or otherwise secured together, leaving the projecting arms or straps at opposite sides of the handle for attachment thereto.

Under the present practice, the blanks are cut or stamped one at a time in a single operation to the exact form required for making the ferrule, thus producing a large percentage of waste of the sheet metal which results in the loss of many thousands of dollars in waste material during the course of the year's output.

The object of my invention is primarily to reduce this waste of material to a minimum, and at the same time to materially increase the output for a given period of time by cutting or stamping a plurality of, in this instance two, ferrule blanks by one and the same set of dies from the same piece of sheet metal and subsequently trimming the main body and spreading the straps so that the main body and expanding straps may be rolled or bent to accurately conform to the contour of the portion of the handle to which the ferrule is applied.

Other objects and uses will be brought out in the following description.

In the drawings I have shown apparatus for carrying out the process or method of manufacturing the ferrules, in which—

Figure 1 is a perspective view of the coöperative dies for cutting or stamping the ferrule blanks from sheet metal.

Fig. 2 is an enlarged top plan of the female die with a portion of a strip of sheet metal therein from which the ferrule blanks are being cut.

Fig. 3 is a top plan of a portion of a strip of sheet metal showing the piece of waste metal removed by the first cut and the result of one succeeding operation thereon for making two ferrule blanks in one and the same operation, the dotted lines at the right of the blanks indicating the cutting lines of the dies in the next succeeding operation.

Fig. 4 is an enlarged plan of one of the detached ferrule blanks as it comes from the dies, the blank being subsequently trimmed along the dotted lines indicated thereon.

Fig. 5 is a perspective view of a device for expanding the arms or straps of the ferrule blanks.

Fig. 6 is an enlarged horizontal sectional view of the same device.

Fig. 7 is an enlarged plan of the completed ferrule blank ready for rolling or bending to the desired form for use upon a handle or other implement, not shown.

In order that these ferrule blanks may be expeditiously cut with a minimum amount of waste, a flat sheet metal strip, as —A—, is employed having a width substantially equal to the length of ferrule required plus the length of the main body of the ferrule, exclusive of the straps so that the opposite longitudinal edges of the strip may form the extreme outer ends of the main bodies of the ferrules, while the edges of the strap portions overlap each other throughout their lengths, the size and form of the straps and of the intervening spaces between them being the same so that two ferrule blanks may be stamped from the same piece of sheet metal by a single set of dies in one and the same operation.

For convenience of further description, each blank may be said to consist of a base portion —a— and two strap portions —a'—, the latter being of the same size and form and cut in spaced relation so that the intervening space may be of the same size and form as that of one of the straps.

The opposite edges of the base —a— of each blank are first cut along parallel lines at right angles to the opposite longitudinal edges of the strip —A— and coincident with the longitudinal center of one of the cutting ribs of the male die so that the outer edges of the strap —a'— may be of the same taper as their inner edges and will lie within the planes of the corresponding edges of the base a distance exactly equal to half the width of the straps, but in reverse order as to taper.

It, therefore, follows that lines drawn through the longitudinal centers of the straps and intervening space will be equal distances apart from each other and from the longitudinal edges of said base.

The means shown for cutting these blanks comprises a female die —1— and a male die —2— mounted, respectively, upon suitable supporting blocks —3— and —4—.

The male die —2— is of the same size and form in plan as the ferrule blank to be cut,— in that it is provided with a base portion —5— having opposite parallel cutting edges —6— and a pair of tapered arms —7— corresponding to the size and form of the straps —a'—, the arms —7— being spaced apart to correspond to the intervening space between the said straps of the blank shown in Fig. 4.

The female die —1— is the counterpart of the male die —2—, in that it is provided with a pair of longitudinally tapered openings or ways —8— corresponding in size and form to the ribs —7— and is also provided with an intervening rib —9— corresponding in size and form to the space between the ribs —7—, the outer walls of the openings —8— constituting cutting edges —10— coöperating with the corresponding edges of the ribs —7— to form the outer longitudinal edges of the straps —a'—.

The adjacent faces of the dies —1— and —2— are substantially flat and are disposed in parallel planes when adjusted for use, it being understood that one of the dies will be movable toward and from the other under sufficient pressure to sever the blanks from the metal sheet or strip —A—.

A plate —11— is rigidly mounted upon the base —3— and extends across the upper face of the female die —1— in sufficiently spaced relation thereto to allow the sheet metal strip —A— to pass flatwise between said female die and plate, the latter serving to hold the sheet against upward displacement from the lower die when the dies are separated after each cutting operation.

This plate is also provided with lengthwise tapered openings —12— corresponding to and registering with the similar underlying openings —8— in the die —1— to form guides for the ribs —7— of the male die —2—.

Mounted upon the base —3— is a lateral guide —13— a distance from the inner ends of the openings —8— and —12— corresponding to the distance between the inner ends of the straps —a'— and outer end of the base portion —a— for engaging one edge of the sheet metal strip —A— and guiding the same in its longitudinal movement during successive cutting operations of the dies upon said strip.

The female die —1— is also provided with a straight cutting edge —14— at the side nearest that into which the sheet metal strip —A— is fed and is adapted to coöperate with the corresponding shearing face —6— of the male die to form the straight parallel edges of the base portion —a— of the left-hand blank, Fig. 2.

The straight edges of the right-hand blanks are cut by similar shearing members —15— and —16— on the dies —1— and —2—, respectively.

A stop —17— is movable through an opening in the plate —11— into and out of the path of the advance end of the strip —A— by means of a hand lever —17'— for limiting the forward movement of the strip in the initial operating of the dies thereon to sever and remove the first waste piece, as —X—, shown in Fig. 3, preparatory to cutting the ferrules.

After this strip —X— is removed, the stop —17— is withdrawn and the strip is then moved forwardly until the front straight edge of the portion thereof which is to form the left-hand blank, Fig. 2, engages a limiting stop —18— which is so adjusted as to stop this edge of the strip at the same distance from the longitudinal center of the upper die as the opposite parallel cutting edge of said die, so that when the dies are brought to their cutting positions, they will cut and remove the foremost left-hand blank and will simultaneously cut, but not remove the foremost right-hand blank, Fig. 2, the latter being removed from the strip as the dies are operated to cut the next succeeding set of blanks so that in reality two blanks are entirely cut and removed in one and the same operation after the first blank has been removed.

Aside from the initial removal of the waste piece —X—, Fig. 3, the operation just described constitutes the first step in the process for making the ferrule,—that is, it consists in cutting the blank to form a base portion having projecting straps as shown in Fig. 4.

The next or second step consists in trimming the longitudinal edges of the base of the blank along diverging lines as shown by dotted lines in Fig. 4 and by full lines in Fig. 7.

The third step consists in spreading the arms or strap portions —a'— to conform when rolled to the tapered portion of a handle to which the ferrule is to be applied, the lower end edge of each base portion —a— being trimmed along an arc, the center of which is at the apex of the angle of the spread straps.

This spreading device consists of a holder —20— having a guide-way —21— of just sufficient size and form to receive and retain one or more blanks, preferably a plurality, one upon the other therein, together with suitable clamping members —22— which extend along and upon the arms of the uppermost blank and are, together with the blanks, clamped in place by a suitable pressure device consisting of a screw —23— and press block —24'— which are carried by the holder —20—, as shown more clearly in Fig. 5.

When the blanks are firmly clamped in place flatwise one upon the other within the holder, a plunger —24— tapered to correspond to the desired spread of the arms —a'— is operated or forced between said arms to spread them apart to the desired angle and distance, as shown in Fig. 7, whereupon the plunger is withdrawn and the clamping device loosened and the ferrule blanks withdrawn from the spreading device ready for a repetition of the operation upon other blanks.

What I claim is:

1. The herein described method of making strap-ferrule blanks consisting in first cutting the blank to form a base portion having projecting straps the longitudinal centers of which are substantially parallel, and afterward spreading the straps edgewise in the same plane to diverge from the base.

2. The herein described method of making strap-ferrule blanks consisting in first cutting the blank to form a base portion having projecting straps the longitudinal centers of which are substantially parallel, then trimming the longitudinal edges of the base portion along converging lines and afterward spreading the straps to diverge in the same direction as the longitudinal edges of the base portion.

3. The herein described method of making strap-ferrule blanks consisting in cutting the blank to form a base portion having parallel straps projecting from one end thereof, spreading the straps edgewise at equal angles to the longitudinal center of the base portion, and trimming the lower edge of the base portion along an arc having its center at the apex of the angle formed by the spread straps.

In witness whereof, I have hereunto set my hand this 20th day of July, 1917.

WINTHROP WITHINGTON.

Witnesses:
E. J. WILKINS,
W. G. COOPER.

Copies of this patent may be obtained for five cents each, by addressing the "Commissioner of Patents, Washington, D. C."